Patented July 24, 1951

2,561,574

UNITED STATES PATENT OFFICE 2,561,574

PREPARATION OF ALPHA-BROMO, OMEGA-BENZOYLAMINO CAPROIC ACID

Eugene E. Howe, Bound Brook, and Edward W. Pietrusza, Morristown, N. J., assignors to Merck & Co., Inc., Rahway, N. J., a corporation of New Jersey No Drawing. Application January 21, 1949, Serial No. 72,096

4 Claims. (Cl. 260—518)

This invention relates to the preparation of amino acids from readily available starting materials. More particularly, it is concerned with a new and improved process for preparing intermediates useful in the synthesis of the amino acid lysine.

Lysine, $\alpha,\epsilon$-diaminocaproic acid, is one of the essential amino acids, i. e. it can not be synthesized, at least in adequate quantities, by the animal itself and must be obtained from external sources, its absence being responsible for the failure of growth in animals and possibly other more serious consequences.

One of the methods most commonly used in the synthesis of lysine involves benzoylation of $\epsilon$-aminocaproic acid, conversion of the resulting $\epsilon$-benzoylaminocaproic acid to $\alpha$-bromo-$\epsilon$-benzoylaminocaproic acid with phosphorus and bromine, ammonolysis of the $\alpha$-bromo acid to $\alpha$-amino-$\epsilon$-benzoylaminocaproic acid, and finally hydrolysis of the $\alpha$-amino acid to dl-lysine. In view of the commercial availability of the starting material, $\epsilon$-aminocaproic acid, this synthesis provides a most convenient and economical method for obtaining dl-lysine. The disadvantages inherent in this process are that the bromination of $\epsilon$-benzoylaminocaproic acid with phosphorus and bromine is not easily effected and that the yields obtained of $\alpha$-bromo-$\epsilon$-benzoylaminocaproic acid are inconsistent and, at times, very poor. In addition, this procedure is unduly complicated in that the brominating step is effected under anhydrous conditions, thereby necessitating careful drying of all reactants and the use of precautionary measures destined to prevent access of any moisture to the brominating mixture.

It is an object of this invention to provide an improved method for brominating $\epsilon$-benzoylaminocaproic acid that will result in a product of good quality and yields consistently higher than those previously obtainable. It is another object of this invention to provide a method of preparing $\alpha$-bromo-$\epsilon$-benzoylaminocaproic acid wherein said acid may be conveniently separated and then used directly in the subsequent ammonolysis step without any need of purification.

A further object of this invention is to provide a simplified method for the bromination of $\epsilon$-benzoylaminocaproic acid without adversely affecting either the quality or the yield of the product.

Whereas in the methods hitherto used, traces of moisture in the bromination of $\epsilon$-benzoylaminocaproic acid were considered to be decidedly detrimental, in marked contrast to this, the present invention is based upon the surprising discovery that the process proceeds more effectively in the presence of water, yields being consistently and substantially higher than those obtained by previous methods. In addition, and also of great importance, is the fact that the brominated acid, when isolated and ammonolyzed without further purification, yields $\epsilon$-benzoyllysine of good quality.

Accordingly, the process of this invention involves the addition of bromine to $\epsilon$-benzoylaminocaproic acid in the presence of red phosphorus and in the presence of an amount of water equivalent to about 1–5% by weight of the $\epsilon$-benzoylaminocaproic acid employed, optimum results being obtained when the quantity of water employed is about 3% by weight of the acid. During the initial part of the reaction, it is preferable to employ an inert reaction solvent such as carbon tetrachloride, chloroform, ethylene dichloride, etc. so that complete and efficient mixing is made possible. When the reaction has progressed sufficiently, the solvent can be removed. On completion of the bromine addition, the reaction mixture is treated with water to hydrolyze the $\alpha$-bromo-$\epsilon$-benzoylaminocaproyl bromide formed, and the resulting $\alpha$-bromo-$\epsilon$-benzoylaminocaproic acid is separated.

The following examples illustrate the method of carrying out the present invention but it is to be understood that these examples are given by way of illustration and are not to be considered as limiting the invention to the particular details described therein.

*Example 1*

37.5 grams (0.16 M) of $\epsilon$-benzoylaminocaproic acid and 6.69 grams (0.213 M) of red phosphorus were dried to constant weight, intimately mixed in a mortar, and transferred to a 500 cubic centimeter, 3-necked flask equipped with dropping funnel, stirrer, thermometer, and a water-cooled condenser connected through a calcium chloride tube to a water trap. One hundred and fifty cubic centimeters of carbon tetrachloride were added to the flask, and the mixture was stirred while brought to a temperature of 10° C. Thirty-four grams (0.214 M) of bromine were added with agitation in 20 minutes, with the temperature kept below 10° C. by means of an ice bath. The reaction temperature was allowed to rise to 35–40° C., and this temperature was maintained while the solution was stirred vigorously. Hydrogen bromide was evolved, and the solution turned to a dark red-orange color. Sixty-eight grams (0.423 M) of bromine were then added slowly at a temperature varying between 35–40° C. The overall addition time was about 1¼ hours. The solution was stirred an additional 15 minutes and then heated at reflux for 3 hours.

Carbon tetrachloride was removed by distillation over a hot water bath for 4 hours. The gummy mass was cooled to room temperature, and 100 cubic centimeters of water were added cautiously, maintaining the temperature of the mixture below 50° C. After the addition of water, the mixture was cooled to 0° C. and a gum formed which crystallized into a solid mass containing $\alpha$-bromo-$\epsilon$-benzoylaminocaproic acid. 1.2 grams of sodium bisulfite were added to the mixture, the solid was pulverized, and the mixture was filtered. The precipitate was washed twice with ice water and dried to constant weight. There was obtained 44.7 grams (a yield of 89%) of $\alpha$-bromo-$\epsilon$-benzoylaminocaproic acid, M. P. 110–140° C.

Example 2

The yield of crude $\alpha$-bromo-$\epsilon$-benzoylaminocaproic acid obtained in Example 1 (44.7 grams) was dissolved in 490 cubic centimeters of concentrated ammonium hydroxide solution. The solution was filtered and allowed to stand for two days in a stoppered flask at room temperature.

The solution was concentrated to about 250 cubic centimeters and cooled. A precipitate of $\epsilon$-benzoyllysine that formed was removed by filtration, washed successively with 25 cubic centimeters of ethanol and 25 cubic centimeters of ethyl ether, and then set aside.

The filtrate and washings remaining from this first crop were concentrated to dryness. A residue containing additional $\epsilon$-benzoyllysine was obtained and was washed twice with 25 cubic centimeter portions of water, once with 13 cubic centimeters of ethanol, and once with 13 cubic centimeters of ethyl ether. The residue of $\epsilon$-benzoyllysine remaining was combined with the first crop and dried to constant weight. There was obtained 17.96 grams (a yield of 50.6%) of $\epsilon$-benzoyllysine, M. P. 265–270° C.

Example 3

37.5 grams (0.16 M) of $\epsilon$-benzoylaminocaproic acid and 5.45 grams (0.176 M) of red phosphorus were dried to constant weight, intimately mixed in a mortar, and transferred to a 250 cubic centimeter, 3-necked flask equipped with dropping funnel, stirrer, thermometer, and a water-cooled condenser connected through a calcium chloride tube to a water trap. One hundred cubic centimeters of carbon tetrachloride and 1.16 cubic centimeters of distilled water (3.1% by weight of the $\epsilon$-benzoylaminocaproic acid) were added to the mixture in the flask and the contents of the flask were vigorously agitated for ½ hour. 70.4 grams (0.44 M) of bromine were added slowly with agitation over a period of about 1¾ hours, with the temperature kept below 50° C. by means of an ice bath. Hydrogen bromide was evolved, and the solution turned to a dark red-orange color. The solution was stirred for an additional hour.

Carbon tetrachloride was removed by distillation over a steam bath and under reduced pressure. 25.6 grams (0.16 M) of bromine were added to the resulting red, viscous mass over a 30 minute period, accompanied by agitation, while maintaining the temperature below 50° C. Agitation was continued for an additional 15 minutes. The mixture was gradually heated to 100° C. and agitated at this temperature for 1 hour. It was then cooled to 70° C., and 4.8 grams (0.03 M) of bromine were added. The mixture was re-heated to 100° C., agitated at this temperature for 30 minutes, and then cooled to 50° C.

Accompanied by vigorous agitation while maintaining the reaction temperature below 50° C. by means of an ice bath, 100 cubic centimeters of water were added cautiously over a period of 1½ hours. The mixture was then cooled to 0° C., transferred to a mortar, and the solid mass containing $\alpha$-bromo-$\epsilon$-benzoylaminocaproic acid was pulverized with a small amount of sodium bisulfite. The solid was removed by filtration and was treated with sodium bisulfite in 50 cubic centimeters of water at 40° C. until it assumed a yellowish-white color. The mixture was cooled to 0° C., filtered, and the solid was washed three times with ice water and dried to constant weight. There was obtained 47.4 grams (a yield of 95%) of $\alpha$-bromo-$\epsilon$-benzoylaminocaproic acid, M. P. 150–160° C.

Example 4

47 grams of the $\alpha$-bromo-$\epsilon$-benzoylaminocaproic acid obtained in Example 3 were dissolved in 500 cubic centimeters of concentrated ammonium hydroxide solution. The solution was filtered, divided into two equal parts, and treated as follows:

(1) One part of the solution was allowed to stand for two days in a stoppered flask at room temperature. A crystalline precipitate of $\epsilon$-benzoyllysine formed which was removed by filtration, and was then set aside. The filtrate was concentrated to about half of its original volume, and a white, crystalline precipitate of $\epsilon$-benzoyllysine was formed which was removed by filtration and combined with the precipitate previously set aside. The combined precipitates were washed successively with 12 cubic centimeters of ethanol and 12 cubic centimeters of ethyl ether.

The filtrate and washings remaining from this first crop were concentrated to dryness. A residue containing additional $\epsilon$-benzoyllysine was obtained and was washed twice with 12 cubic centimeters of water, once with 12 cubic centimeters of ethanol, and once with 12 cubic centimeters of ethyl ether. The residue of $\epsilon$-benzoyllysine remaining was combined with the first crop and dried to constant weight. There was obtained 13.5 grams (a yield of 70.3% of $\epsilon$-benzoyllysine, M. P. 268–273° C.

(2) The second part of the original solution was heated at 100° C. under pressure for 4 hours. $\epsilon$-Benzoyllysine was then isolated in the same manner as in part (1). There was obtained 13.77 grams (a yield of 73.6%) of $\epsilon$-benzoyllysine, M. P. 265–270° C.

Of the previous examples, Examples 1 and 2 illustrate bromination carried out under anhydrous conditions and subsequent ammonolysis; Example 3 illustrates one method of carrying out the present invention, and Example 4 illustrates the direct ammonolysis of the product of Example 3. The examples illustrate particularly the increased yields obtainable when the process of the present invention is employed.

Various changes and modifications may be made in carrying out the present invention without departing from the spirit and scope thereof. Insofar as these changes and modifications are within the scope of the appended claims, they are to be considered as part of this invention.

We claim:

1. The method for preparing α-bromo-ε-benzoylaminocaproic acid in high yield which comprises adding bromine incrementally to an agitated mixture of ε-benzoylaminocaproic acid, red phosphorus and an amount of water equivalent to about 1-5% by weight of said ε-benzoylaminocaproic acid while cooling the reaction mixture, and after completion of the bromine addition, agitating and refluxing said mixture, adding water thereto, and then separating and recovering the desired product in substantially pure form from said mixture.

2. The method for preparing α-bromo-ε-benzoylaminocaproic acid in high yield which comprises adding bromine incrementally to an agitated mixture of ε-benzoylaminocaproic acid, red phosphorus and an amount of water equivalent to about 3% by weight of said ε-benzoylaminocaproic acid while cooling the reaction mixture, and after completion of the bromine addition, agitating and refluxing said mixture, adding water thereto, and then separating and recovering the desired product in substantially pure form from said mixture.

3. The method for preparing α-bromo-ε-benzoylaminocaproic acid in high yield which comprises adding bromine incrementally to an agitated mixture of ε-benzoylaminocaproic acid, red phosphorus and an amount of water equivalent to about 1-5% by weight of said ε-benzoylaminocaproic acid while maintaining the solution temperature below 50° C., agitating and refluxing said mixture, adding water thereto, and then separating and recovering the desired product in substantially pure form from said mixture.

4. The method for preparing α-bromo-ε-benzoylaminocaproic acid in high yield which comprises adding bromine incrementally to an agitated mixture of ε-benzoylaminocaproic acid, red phosphorus and an amount of water equivalent to about 3% by weight of said ε-benzoylaminocaproic acid while maintaining the solution temperature below 50° C., agitating and refluxing said mixture, adding water thereto, and then separating and recovering the desired product in substantially pure form from said mixture.

EUGENE E. HOWE.
E. W. PIETRUSZA.

REFERENCES CITED

The following references are of record in the file of this patent:

Von Braun: Ber. Deut. Chem., vol. 42, pp. 842–846 (1909).

Eck et al.: J. Biol. Chem., vol. 106, page 390 (1934).